United States Patent [19]

McKie

[11] Patent Number: 4,704,904
[45] Date of Patent: Nov. 10, 1987

[54] HIGH TEMPERATURE GAS FLOW METER

[75] Inventor: Robert T. McKie, Boise, Id.

[73] Assignee: Morrison-Knudsen Company, Inc., Boise, Id.

[21] Appl. No.: 807,296

[22] Filed: Dec. 10, 1985

[51] Int. Cl.$^4$ ............................................. G01F 1/68
[52] U.S. Cl. ...................................... 73/204; 374/35
[58] Field of Search ............... 73/204, 861.04, 861.07; 374/31, 35

[56] References Cited

U.S. PATENT DOCUMENTS

| | | |
|---|---|---|
| 1,614,702 | 1/1927 | Wilson . |
| 2,015,249 | 9/1935 | Benesh .................................... 73/68 |
| 3,138,025 | 6/1964 | Fingerson .............................. 72/339 |
| 3,301,059 | 1/1967 | Haas ...................................... 374/35 |
| 3,561,266 | 2/1971 | Auphan et al. ........................ 73/204 |
| 3,733,899 | 5/1973 | Auphan et al. ........................ 73/204 |
| 3,915,155 | 10/1975 | Jacobson et al. ............... 128/205 F |
| 4,275,601 | 6/1981 | Macko .................................... 73/204 |
| 4,339,949 | 7/1982 | Bahner et al. ......................... 73/204 |

FOREIGN PATENT DOCUMENTS 0127811 8/1982 Japan .................................... 73/204

Primary Examiner—Herbert Goldstein
Attorney, Agent, or Firm—Walter J. Blenko, Jr.

[57] ABSTRACT

A high temperature gas meter provides a liquid injection means, at least one temperature sensing means located upstream from the liquid injection means and a liquid flow measuring means. Alternatively, a second temperature sensing means may be employed downstream from the liquid injection means. The meter uses the change in temperature of a gas flowing through a conduit recorded at temperature sensing means before and after injection into the gas stream of a liquid of known quantity and temperature. The flow of the gas is inversely proportional to the change in temperature recorded prior to liquid injection and after liquid injection.

10 Claims, 1 Drawing Figure

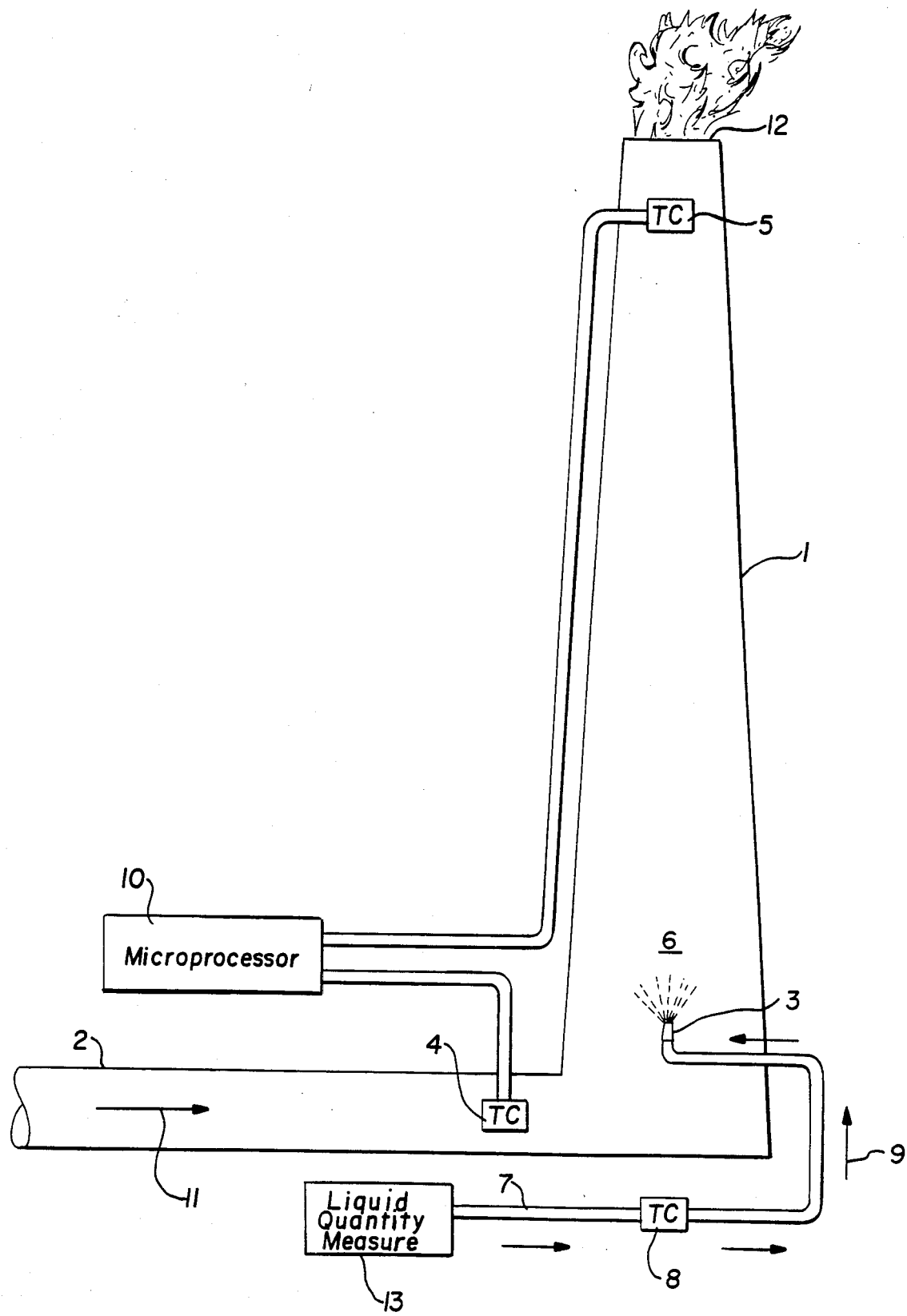

HIGH TEMPERATURE GAS FLOW METER

This application relates to a high temperature gas flow meter which measures the flow of gases, such as stack gases. More particularly, this application relates to measuring the flow of a gas by measuring the temperature of the gas with and without the addition of a fluid to a gas.

It is often desirable to measure gas flow in a conduit, such as a stack. Such measurement might be used, for example, in measuring gas flow in hot stacks for waste heat recovery, calibrating other flow equipment, and determining heat loss to estimate heat balance in a plant.

A number of varied proposals for measuring mass flow have been made. The measurement of high temperature, high volume gas is expensive, inaccurate, undependable and complicated. Many methods involve introducing external means into the gas flow or using many measurements, such as differential pressure.

It has also been proposed to measure mass flow by measuring the temperature difference in a flowing mass before and after injection of a liquid. That concept is sometimes known as thermodilution and has been used for measuring circulating blood flow. Jacobson et al., U.S. Pat. No. 3,915,155 disclosed the concept of thermodilution whereby cold indicator fluid, at a known temperature, rate and quantity, is injected into a blood stream. The change in temperature of the circulating blood, measured upstream and downstream from the point of injection, with the indicator fluid variables is used to determine the blood flow.

Wilson, U.S. Pat. No 1,614,702, discloses a fluid meter whereby a measured quantity of a fluid medium, drawn from a tank, circulates through a coil which is uniformly distributed within a housing. The tank contains elements to change the temperature of the fluid medium which alters the temperature of the coil. The temperature change of the fluid medium before and after passage through the coil is measured by thermometers positioned at the entrance and exit of the coil. A thermometer records the temperature of the fluid to be measured in advance of the coil and another records the temperature of the fluid to be measured at the exit side of the coil. Flow is computed by multiplying the quantity of the fluid medium, the temperature change in the fluid medium and the specific heat of the fluid medium and dividing that total by the temperature change of the fluid to be measured multiplied by the specific heat of the fluid to be measured.

Benesh, U.S. Pat. No. 2,015,249, discloses measuring fluid or gas flow by using a main conduit and an auxiliary conduit. The auxiliary conduit is designed to withdraw part of the fluid to be measured from the main conduit and after a heat exchange, return the fluid to the main conduit. A thermal change, preferably addition of heat through coils located within each conduit, is produced in the fluid of the main and auxiliary conduit. The heat added to the fluid, as well as the ratio of the flow between the two conduits, are known. The ratio of the main conduit mass to the auxiliary conduit mass determines fluid flow.

Bahner et al., U.S. Pat. No. 4,339,949, discloses measuring mass flow by passing a mass through a hollow tube of known thickness. The tube is heated by the use of coils located within the tube walls. The temperature is measured upon entry and exit of the tube and the temperature differential is measured at known thicknesses through the walls of the tube. The mass flow is the difference between the heating power and the temperature difference, as measured at the entry and exit of the tube, multiplied by a proportionality factor. This total is divided by the difference in inlet and outlet temperature as multiplied by the specific heat of the mass.

Fingerson, U.S. Pat. No. 3,138,025, uses the amount of energy necessary to maintain a conductor at constant temperature as a means to measure high temperature fluid flow. A temperature-sensitive probe has a surface coating that is maintained at a predetermined constant temperature which is less than the temperature of the environment of the fluid to be measured. Heat is then transferred from the fluid environment to the surface coating. Means for measuring the amount of current required to maintain the surface coating at a predetermined constant temperature is used to measure fluid flow.

I provide a high temperature gas flow meter which measures the flow of gases in a conduit. I provide temperature sensing means and liquid injection means. I provide temperature sensing means generally downstream from the point of liquid injection. I may provide second temperature sensing means generally upstream from the point of the liquid injection means. I additionally provide a liquid flow measuring means. I additionally provide temperature change recordation means. I preferably provide thermocouples to measure the temperature of the gas. I preferably provide a nozzle as the liquid injection means. I preferably provide a microprocessor as the temperature change comparison means. I preferably provide water as the liquid.

I measure high temperature gas flow in a conduit by injecting a measured quantity of a liquid into a gas flow and measuring the temperature of the gas with injection of liquid and without injection of liquid. Preferably, I measure the temperature of the gas upstream from a point of liquid injection and downstream from a point of liquid injection. Preferably, I inject water into the gas stream in liquid form.

In the accompanying drawing, I have illustrated a present preferred embodiment of my invention in diagrammatic form. A smoke stack 1 for a plant discharges hot gases into the atmosphere. A conduit 2 connects the source of hot gas to the stack. The hot gases pass through the conduit in the direction indicated by arrow 11 and exit from the stack at 12. Thermocouples 4 and 5 are placed in the conduit and act to measure the temperature of the hot gas flowing by them.

Located between the temperature sensing means is a nozzle 3. A liquid conduit means 7 feeds liquid to the nozzle 3 in direction 9 which is injected into the conduit 6 in the form of a mist. The liquid conduit means 7 is operatively associated with a liquid quantity measuring means 13 which measures the liquid quantity that is to be injected into the gas stream. The liquid quantity injection means is operatively associated with the microprocessor 10 which records the quantity. A thermocouple 8 is provided to measure injection liquid temperature and is operatively associated with the microprocessor 10. The thermocouples 4 and 5 are also operatively associated with a temperature recordation means 10. In this preferred embodiment, gas flows into the conduit 2 in direction 11. After passing thermocouple 4, the temperature is measured and recorded at 10. Liquid is drawn through the liquid conduit means 7. The temperature of the liquid is recorded at temperature sensing means 8, and the quantity of liquid is measured at 13. The liquid is then passed through the liquid conduit means 7 to the nozzle and injected into the flowing gas stream. The gas flows past the nozzle 3 injecting liquid 6 in the form of a mist and is admixed with the liquid. The gas continues to flow through the conduit, and prior to exiting the conduit the temperature of the gas is measured at thermocouple 5. The distance to thermocouple 5 should be adequate for the liquid to become heated and dispersed throughout the gas stream. The temperature measured at thermocouple 5 is recorded at the temperature recordation means 10. The temperature recordation means 10, which preferably is a microprocessor, records the change in gas temperature and calculates gas flow.

The present invention measures the flow of a gas by injecting into a flowing gas stream a measured quantity of liquid. The temperature of the gas is measured before and after injection. The heat added to the liquid is identical to the heat loss of the gas from the liquid and thereby determines the quantity of the gas and the flow. Generally, gas flow is inversely proportional to the temperature.

The heat loss through the stack walls is negligible and may ordinarily be disregarded. That loss can be readily determined and incorporated into the heat change in the gas flow calculations, if desired.

Water is injected into the gas flowing through the stack. There is admixture between the water and the gas and the admixture brings the water and gas to the same temperature. The amount of heat used to raise the temperature of the known quantity of water from water at the time of injection to vapor at the stack exit is equal to the heat taken from the gas. This increased heat in the water comes from the gas and lowers the temperature of the gas. In other words, the heat gain by the water is equal to the heat loss of the gas. The temperature increase or heat gain of the water is the total of the quantity of water multiplied by the specific heat of the water between injection temperature and vaporization temperature plus the latent heat of vaporization plus the specific heat of steam between vaporization temperature and exit or final stack temperatures. By determining the amount of heat extracted from the gas and knowing the specific heat of the gas, the quantity of gas flowing can be readily calculated.

Thermocouples 4 and 5 will give readings of the temperature of the gas flowing past them. The temperatures at thermocouples 4 and 5 may be designated as $T_1$ and $T_2$, respectively. When gas is flowing in conduit 2, there will be a negligible heat loss through the walls of the conduit. Accordingly, when gas is flowing and no water is being injected at injector 3, $T_1$ and $T_2$ will be identical. If water is injected into the gas stream as a spray at injector 3, the water will be admixed with the gas and the temperature of the water will be raised to the temperature of the gas by transfer of heat from the gas. The loss of heat from the gas to the water will cause a lowering of the gas temperature. Under those conditions, $T_2$ will be less than $T_1$, and the difference between them may be expressed as dT, thus:

$$T_1 - T_2 = dT.$$

The amount of heat required to raise the temperature of a given quantity of water from ambient temperature, $T_a$, through vaporization temperature, $T_v$, to $T_2$ is equal to the heat required to raise water from ambient temperature to vaporization temperature, i.e. $(T_v - T_a) \times$ specific heat plus heat of vaporization to convert the water at vaporization temperature to saturated vapor, i.e., $h_v$ plus heat required to superheat the saturated vapor to $T_2$, i.e. $(T_2 - T_v) \times$ specific heat If the quantity of water injected in a given unit of time is known, the amount of heat required to raise the temperature of the liquid at ambient temperature to superheated vapor at $T_2$ can be determined readily by use of steam tables.

Since the heat absorbed by the water is taken only from the gas, the total amount of heat extracted from the gas is identical to the total amount of heat added to the liquid. The specific heat of the gas multiplied by dT will give the amount of heat extracted per unit (e.g. pounds) of gas. Dividing that figure into the total amount of heat transferred will give the number of units of gas passing through the conduit during the period that liquid injection takes place.

The apparatus shown in the drawing may be used continuously, thereby giving a continuous indication of gas flow. Alternatively, a single thermocouple 5 may be used to determine gas flow. At a time when no water is being injected, thermocouple 5 will register the temperature of the gas before reaching the injector. This will be the same as $T_1$ in the preceding example. Injection of water will cause the gas to be cooled and thermocouple 5 will read a lower temperature $T_2$. The gas flow may then be determined in the manner outlined above. The accuracy of the flow measurement when using a single thermocouple is dependent upon a steady and unchanging temperature in the incoming gas.

The calculation of the gas flow may be done manually or by using a microprocessor.

The type of liquids used in the invention depend upon the type of gas used and the characteristics of the fluid itself. The preferred fluid is water due to low cost and availability.

For increased accuracy, the temperature of tne liquid being injected into the conduit may be recorded at temperature sensing means 8. Normally, however, it is sufficient to assume the liquid is at ambient temperature and in view of the relatively large value of the heat of vaporization.

In an alternative embodiment, thermocouple 4 may be omitted. In this embodiment, the liquid is injected into the gas stream for timed intervals. The temperature of the liquid is measured at 8. The quantity of the liquid is measured at 13. The temperature of the gas stream is measured during the timed interval when the liquid is being injected and admixed into the gas stream at 6. The temperature of the gas stream is also measured during the timed interval when the liquid is not being injected into the gas stream. A change in the temperature is recorded in the same manner as when two thermocouples are used. This embodiment assumes a steady state of conditions of the gas stream in the conduit when the liquid is not being injected.

In a further alternative embodiment, thermocouple 8, which measures injection liquid temperature, may be omitted. This omission is applicable whether one or two thermocouples which are used to measure gas temperature are used. This embodiment assumes that the liquid to be injected will be at an ambient temperature. Since the amount of energy required to offset changes in ambient temperature is small when compared to the total heat required to raise the water to the gas temperature, variations in ambient temperature may normally be disregarded as insignificant.

While I have illustrated and described certain present embodiments of the invention, it is to be understood that the invention is not limited thereto and may be otherwise variously practiced within the scope of the following claims.

I claim:

1. Apparatus for measuring the quantity of a flowing gas at high temperature comprising:
    a gas flow conduit including a smoke stack for discharge of hot gas into the atmoshpere;
    liquid injection means located within the conduit for injection of liquid into the flowing gas;
    liquid conduit means operatively associated with the liquid injection means and extending from a source of liquid to the liquid injection means;
    temperature sensing means for measuring gas temperature positioned within said conduit, downstream from said liquid injection means;
    liquid quantity measuring means for measuring a liquid quantity that is injected into said conduit; and means responsive to said temperature sensing means and said liquid quantity measuring means to provide a measure of gas flow.

2. The apparatus of claim 1, wherein the temperature sensing means is a thermocouple.

3. The apparatus of claim 1, wherein the liquid is water.

4. The apparatus of claim 1, wherein the liquid injection means is a nozzle.

5. The apparatus of claim 1, including a liquid temperature sensing means.

6. Apparatus for measuring the quantity of a flowing gas at high temperature comprising:
    a gas flow conduit including a smoke stack for discharge of hot gas into the atmosphere;
    liquid injection means positioned to inject liquid into the flowing gas stream;
    liquid conduit means operatively associated with the liquid injection means and extending from a source of liquid to the liquid injection means;
    temperature sensing means for measuring gas temperature positioned within said conduit, downstream from said liquid injection means;
    second temperature sensing means for measuring the gas temperture positioned within said conduit, upstream from said liquid injection means;
    liquid quantity measuring means for measuring a liquid quantity that is injected into said conduit; and
    means responsive to both temperature sensing means and said liquid quantity measuring means to provide a measure of gas flow.

7. A method of measuring the quantity of high temperature gas flowing in a conduit which includes a smoke stack comprising:
    injecting a quantity of a liquid into the gas stream;
    measuring the quantity of said liquid;
    measuring the temperature increase of the liquid by heat obtained from the gas and measuring the temperature decrease of the gas which results from the transfer of heat to the liquid;
    measuring the amount of heat absorbed by the liquid during a given time period, and computing the flow of gas.

8. A method of measuring the quantity of high temperature gas flowing in a conduit which includes a smoke stack comprising:
    measuring the temperature of a gas stream;
    injecting a quantity of liquid into the gas stream;
    measuring the quantity of said liquid;
    measuring the temperature of the gas stream and entrained liquid after injection;
    computing the sum of the amount of heat required to raise the temperature of the measured quantity ofliquid from injection temperature to vaporization temperature multiplied by the specific heat of said liquid and the heat of vaporization to convert the liquid at vaporization temperature to vapor and the heat required to superheat the vapor to the temperature of the gas stream and liquid after injection, to give the total heat transfer;
    computing the change in temperature of the gas before and after injection;
    multiplying the specific heat of the gas by said change in temperature to give the amount of heat extracted per unit; and
    dividing said unit into the total heat transfer.

9. The method of claim 7, wherein the temperature of the measured quantity of liquid is measured.

10. A method of measuring the quantity of high temperature gas flowing in a conduit which includes a smoke stack comprising:
    injecting a quantity of a liquid into a gas stream;
    measuring the quantity of said liquid;
    measuring the temperature increase of the liquid by heat obtained for the gas and measuring the temperature decrease of the gas by giving up heat to the liquid;
    computing the amount of heat absorbed by the liquid during a given time period from the quantity of liquid injected and the temperature increase of the liquid; and
    computing the quantity of gas from the amount of decrease in the temperature of the gas and the amount of heat transferred to the liquid.

* * * * *

UNITED STATES PATENT AND TRADEMARK OFFICE
CERTIFICATE OF CORRECTION

PATENT NO. : 4,704,904
DATED : November 10, 1987
INVENTOR(S) : Robert T. McKie

It is certified that error appears in the above-identified patent and that said Letters Patent is hereby corrected as shown below:

On the title page

In the references cited, U. S. Patent Documents, change class for Fingerson patent from "72/339" to --73/339--.

Column 2, line 47, delete the period after "indicated";
column 5, line 17, change "atmoshpere" to --atmosphere--;
column 5, line 53, change "temperture" to --temperature--;
column 6, line 26, change "ofliquid" to --of liquid--;
column 6, line 47, change "for" to --from--.

Signed and Sealed this

Twenty-ninth Day of March, 1988

*Attest:*

DONALD J. QUIGG

*Attesting Officer*   Commissioner of Patents and Trademarks